United States Patent [19]

Vartanian et al.

[11] 4,183,732
[45] Jan. 15, 1980

[54] USE OF QUATERNARY AMMONIUM SALTS OF NITROGEN CONTAINING POLYMERS FOR IMPROVED CARBURETOR DETERGENCY

[75] Inventors: Paul F. Vartanian, Wappingers Falls; Joseph B. Biasotti, Lagrangeville, both of N.Y.

[73] Assignee: Texaco Inc., White Plains, N.Y.

[21] Appl. No.: 860,548

[22] Filed: Dec. 14, 1977

[51] Int. Cl.² ................................................ C10L 1/20
[52] U.S. Cl. ............................................. 44/62; 44/70
[58] Field of Search ........................ 44/62, 70; 260/895

[56] References Cited

U.S. PATENT DOCUMENTS

| | | | |
|---|---|---|---|
| 2,737,452 | 3/1956 | Catlin et al. | 44/62 |
| 2,805,925 | 9/1957 | Biswell | 44/62 |
| 3,664,990 | 5/1972 | Slagel | 260/895 |
| 3,678,098 | 7/1972 | Lewis et al. | 526/312 |
| 4,039,634 | 8/1977 | Couchoud | 260/895 |

Primary Examiner—Winston A. Douglas
Assistant Examiner—Y. Harris-Smith
Attorney, Agent, or Firm—Robert A. Kulason; Carl G. Ries; James J. O'Loughlin

[57] ABSTRACT

A quaternary ammonium salt of a copolymer, said copolymer being the olefin polymerization product of:
(A) a nitrogen amine free ester of a $C_1$–$C_6$ olefinically unsaturated aliphatic mono-, di-, or polycarboxylic acid having a tertiary nitrogen atom; and
(B) an olefinically unsaturated comonomer containing a basic nitrogen atom in a side chain;

a fuel component, especially gasoline, containing such quaternary ammonium salt of such copolymer as a detergent.

5 Claims, No Drawings

USE OF QUATERNARY AMMONIUM SALTS OF NITROGEN CONTAINING POLYMERS FOR IMPROVED CARBURETOR DETERGENCY

BACKGROUND OF THE INVENTION

1. Field of the Invention

This invention relates to a quaternary ammonium salt of a copolymer. More especially this invention relates to the use of a quaternary ammonium salt of a copolymer as a detergent for fuels, especially gasoline. This invention is particularly concerned with use of such quaternary ammonium salt of such copolymer not only to remove deposits on an engine carburetor but to prevent deposit build-up on an engine carburetor.

2. Discussion of the Prior Art

Various detergents have been proposed for use in fuels, especially gasoline. For instance, it has heretofore been proposed to employ as a gasoline detergent a condensation product of a secondary $C_{10}$ amine with maleic anhydride. Similarly, it has been proposed to use an amine polyisocyanate detergent. Both of these known types of gasoline detergents are effective in removing deposit build-up upon an automotive engine carburetor. However, the known commercially available types of gasoline detergents are particularly costly in production, thus adding to the cost of the final gasoline product at the pump.

It has become desirable, therefore, to provide a less expensive, yet effective, gasoline detergent. It has heretofore been proposed by Catlin et al in U.S. Pat. No. 2,737,452 to use as a fuel oil stabilizer at least 0.001 percent by weight of an oil soluble, basic amino nitrogen-containing addition type polymer of a plurality of polymerizable ethylenically unsaturated compounds, at least one of which is amine-free and contains about 18 carbon atoms in an aliphatic hydrocarbon chain which, while in the polymer, is not part of the main polymer chain. The polymer also contains units which supply a basic amino nitrogen in the side chain, the polymer containing 0.1 to 3.5 percent by weight of basic amino nitrogen. The basic amino nitrogen is supplied by a compound such as β-diethylaminoethyl methacrylate. Such stabilizers are effective in stabilizing catalytically cracked fuel oils. They also possess some degree of detergency.

These stabilizers can be produced at substantially less cost than stabilizers such as a maleic acid-secondary $C_{10}$ amine condensation product of amine polyisobutylene.

It has become desirable, however, to provide a gasoline detergent having greater efficacies than those heretofore proposed by Catlin et al. More especially, it has become desirable to provide a gasoline detergent which not only removes deposit build-up from an engine carburetor, but inhibits the build-up of such deposit on such carburetor.

SUMMARY OF THE INVENTION

The objects of this invention are provided by a quaternary ammonium salt of a copolymer, said copolymer being the olefin polymerization product of:

(A) a nitrogen amine free ester of a $C_1$-$C_6$ olefinically unsaturated aliphatic mono-, di- or polycarboxylic acid having a tertiary nitrogen atom; and (B) an olefinically unsaturated comonomer containing a basic amino nitrogen in a side chain.

It has been discovered in accordance with the invention that by forming a quaternary ammonium salt of a copolymer of the type disclosed by Catlin et al that an improved gasoline detergent is provided. The gasoline detergent not only has improved ability to remove deposits which have built up upon an automotive engine carburetor but, more significantly, has an enhanced ability to prevent deposit build-up on an initially clean carburetor.

The present invention is, therefore, a quaternary ammonium salt of a known copolymer, such as the copolymer described in Catlin et al, U.S. Pat. No. 2,737,452, the disclosure of which is hereby specifically incorporated herein by reference. Quaternary ammonium salts of such copolymers can be prepared by contacting the polymer thereof with a compound having the formula RX where R represents an alkyl radical of up to 8 carbon atoms, especially methyl, ethyl, propyl and isopropyl and X represents a halide, cyanide or sulfate radical.

The reaction can be described by the following equation:

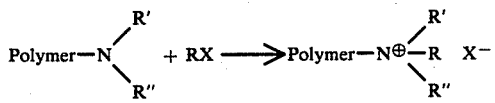

In the equation, R' and R" represent organic, e.g., hydrocarbon, moieties or hydrogen and include moieties such as alkyl, alkenyl, alkynyl, aryalkyl, alicyclic, cycloaliphatic, e.g., cycloalkyl, aromatic, aryl, and the like. R represents an alkyl radical, especially methyl, ethyl, propyl and isopropyl. Generally, each R group has up to 18 carbon atoms, especially up to 8 carbon atoms.

The salts so prepared can be converted to a more suitable quaternary ammonium salt by ion exchange in accordance with the following formula:

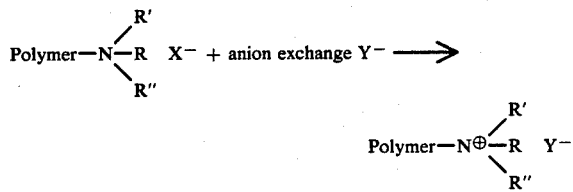

where Y is an anion such as halogen, cyano, sulfate, nitrate, hydroxyl, phosphate, acetate, carbonate, sulfonate, to name a few.

The quaternary ammonium salt is formed essentially by a relatively simple process using as a reactant any of the copolymers disclosed in Catlin et al, discussed supra, having a tertiary nitrogen atom. Generally speaking, the copolymer is reacted with a stoichiometric excess of the compound of the formula RX, especially a 5 to 15 mol percent excess. The copolymer and alkyl halide, cyanide or sulfate are heated at a temperature of 40° to 150° C., preferably at conditions of reflux for between 15 and 20 minutes. While the reaction can be conducted at sub-atmospheric pressure and super atmospheric pressure, it is desirably conducted at atmospheric pressure. The reaction can take place in the presence of a solvent such as benzene, paleoil, xylene, or the like.

With respect to the copolymer, the compolymer is preferably one prepared in accordance with copending application Ser. No. 847,643, entitled *Use of Nitrogen Containing Polymers Prepared From Methacrylic Esters As Carburetor Detergents And Corrosion Inhibitors,* assigned to the assignee hereof, of Messrs. Cusano, Rubin, Jones and Vartanian, the disclosure of which is hereby incorporated herein by reference. The copolymer thereof comprises:

($A_1$) a $C_1$–$C_6$ saturated or unsaturated, substituted or unsubstituted, aliphatic or aromatic ester of an unsaturated, aliphatic, mono-, di-, or polycarboxylic acid of $C_1$–$C_6$ chain length in amounts of between 5 and 30 weight percent and most preferably 15 to 25 weight percent, based upon the weight of the copolymer; and ($A_2$) a $C_8$–$C_{20}$ saturated or unsaturated, substituted or unsubstituted, aliphatic or aromatic ester of an unsaturated mono-, di- or polycarboxylic acid of $C_1$–$C_6$ chain length in the amount of 50 to 81 weight percent based upon the weight of the copolymer. The balance of the copolymer is preferably made up of amino nitrogen containing compounds having a tertiary nitrogen atom. They are present in an amount of 4 to 20 weight percent, preferably 7 to 20 weight percent.

The esters are preferably esters of acids such as methacrylic, acrylic, fumaric, maleic or butenic acid. Where substituents are present on the ester group, said substituents can be halogen, cyano, hydroxyl, mercapto, or acetyl, it being understood that the amount of halogen or sulfur in the stabilizer is limited by upper limits for their content. Such preferred copolymer has a molecular weight determined by vapor phase osmometry of between 500 and 4,000.

The copolymer which is subjected to the reaction to form the quaternary ammonium salt can be prepared by conventional bulk solution or dispersion polymerization methods involving known initators including oxygen-yielding compounds such as benzoyl peroxide, di-tert.-butyl peroxide and azo initiators such as azobisisobutyronitrile. The polymers can be prepared in solution or neat.

Preferably, with respect to component $A_2$ supra, the same is, in turn, made up of a mixture of $C_{16}$–$C_{20}$ esters of $C_1$–$C_6$ aliphatic carboxylic acid and $C_{12}$–$C_{15}$ esters of aliphatic carboxylic acids. Thus, in turn, component $A_2$ preferably comprises:

($A_{2a}$) between 10 and 25 percent, especially 15 to 20 percent by weight, based upon the weight of the copolymer, of $C_{16}$–$C_{20}$ esters of a $C_1$–$C_6$ olefinically unsaturated aliphatic mono-, di- or polycarboxylic acid; and ($A_{2b}$) 40 to 60 weight percent, preferably 50 to 55 weight percent, based upon the weight of the copolymer, of $C_{12}$–$C_{15}$ esters of a $C_1$–$C_6$ olefinically unsaturated aliphatic mono-, di- or polycarboxylic acid.

The ester group itself is preferably an alkyl group, but can also be another group such as alkenyl, alkynyl, alicyclic, cycloalkyl, aralkyl and the like. Thus, the ester group can be both saturated and unsaturated and can contain oxygen or sulfur in the chain.

The esters used to form the copolymer are preferably both short chain esters, in accordance with component $A_1$, and long chain esters, in accordance with component $A_2$. It is to be understood that the esters of components $A_1$ and $A_2$ can be esters of the same or different carboxylic acid.

With respect to the olefinically unsaturated copolymer containing the basic amino nitrogen in the side chain, a wide variety of compounds are usable therefore. These compounds include tertiary amines which can be supplied by a wide variety of aliphatic, heterocyclic and aromatic compounds. Particularly contemplated amines are compounds such as p-($\beta$-diethylaminoethyl) styrene, basic nitrogen-containing heterocyclics where the nitrogen atom is bonded to three organic moieties and the compound contains a polymerizable ethylenically unsaturated substituent. The vinyl pyridines are examples of such compounds. Also contemplated are tertiary amines such as esters of basic amino compounds with unsaturated carboxylic acids such as the alkyl- and cycloalkyl-substituted amino alkyl and cycloalkyl esters of the acrylic and alkylacrylic acids, e.g., the dialkylaminoalkyl acrylates and alkylacrylates of which 4-diethylaminocyclohexylmethacrylate is an example. Also contemplated are unsaturated ethers of basic amino alcohols, such as the vinyl ethers of such alcohols, including $\beta$-diethylaminoethyl vinyl ether. Amides of unsaturated carboxylic acids wherein a basic amino substituent is carried on the amide nitrogen are also contemplated, such as N-($\beta$-dimethylaminoethyl) acrylamide, polymerizable, unsaturated basic amines, e.g., diallyl amine and the like.

The polymerization to form the basic copolymer is usually carried out in an inert atmosphere such as nitrogen or carbon dioxide at temperatures ranging from 30° to 150° C., depending upon the catalyst used, and generally at temperatures between 50° and 70° C. when an $\alpha$-$\alpha'$-azodiisobutyronitrile is employed as catalyst. It is important to carry out the copolymerization to such an extent that very little original monomer remains with the polymeric product.

The quaternary ammonium salt of this invention is useful in a fuel as a detergent thereof. It is particularly contemplated for use in gasoline, where it not only removes deposits from an engine carburetor, but actually prevents deposit build-up on the components of such carburetor. Generally speaking, the detergent is present in the fuel in an amount of between 0.005 and 1 weight percent, preferably 0.05 to 0.75 weight percent.

In order to more fully illustrate the nature of the invention and the manner of practicing the same, the following examples are presented:

EXAMPLES

A nitrogen-containing polymer prepared from 4-vinyl pyridine, butylmethacrylate and a mixture of long chained esters of methacrylic acid was prepared by the following technique:

Into a one liter resin kettle fitted with external heating, thermometer, nitrogen inlet, stirrer and condenser, there was charged 54.5 percent by weight of Neodol 25 L methacrylate (a $C_{12}$–$C_{15}$ side chain ester of methacrylic acid having an average chain length of 13.6 carbon atoms), 16.6 weight percent of Alfol 1620 methacrylate (a $C_{16}$–$C_{20}$ side chain ester of methacrylic acid having an average ester chain length of 17.1 carbon atoms), 20 percent by weight butylmethacrylate and 9 percent by weight 4-vinyl pyridine. The reactants were admixed with n-dodecylmercaptan and heated to 95° C. under a nitrogen blanket in the presence of azobisisobutyronitrile as polymerization initiator. Polymerization was permitted to continue until the polymerization was substantially complete. The polymerization was effected for a period of about six hours at 95° to 100° C.

PREPARATION OF QUATERNARY AMMONIUM SALT OF THE POLYMER 100 g of the polymer so-prepared were mixed with 12 g of methyl iodide and 150 ml of benzene is a 500 ml round bottom three neck flask fitted with a reflux condenser and a motor driven stirrer. The mixture was heated at reflux for 30 minutes and the benzene solvent thereafter was removed by distillation under pressure. The resultant quaternary ammonium salt of the nitrogen-containing polymer was thereafter evaluated for its ability to prevent deposit build-up on the components of an automotive carburetor. To test the same, the quaternary ammonium salt was evalutated in accordance with the 1973 Buick Carburetor Detergency Test. This test measures the ability of the detergent to prevent deposit build-up on an initially clean carburetor. The test uses a 1973 Buick 350 CID V8 engine equipped with a two-barrel carburetor. The engine was mounted on a dynamometer test stand and had operating and exhaust gas return, an air induction reactor and a positive crankcase ventilator. The test cycle, shown in Table I, is representative of normal road conditions. Approximately 300 gallons of fuel and 3 quarts of oil were required for each run.

Prior to each run, the carburetor was completely reconditioned. Upon completion of the run, the throttle plate deposits were rated visually according to a merit rating scale of 1 to 10 with "1" applied to extremely heavy deposits on the throttle and "10" to a completely clean plate. The test was conducted under various stages, Stage I, Stage II and Stage III, representing different engine operating conditions insofar as engine speed, torque, duration, and the like. Thus, the test was conducted by initially running the engine at 650±25 r.p.m. for one hour followed by three hours at 1500±25 at 80±2 foot pounds torque followed by one hour at 2000±25 at 108±2 foot pounds torque. The cycles were repeated in such order for a total of 120 hours.

TABLE I

| 1973 BUICK CARBURETOR DETERGENCY TEST OPERATING CONDITIONS | | | |
|---|---|---|---|
| | Stage I | Stage II | Stage III |
| Duration - hours | 1 | 3 | 1 |
| Speed, r.p.m. | 650±25 | 1500±25 | 2000±25 |
| Torque, foot pounds | 0 | 80±2 | 108±2 |
| Water out, °F. | 205±5 | 205±5 | 205±5 |
| Carburetor Air, °F. | 140±5 | 140±5 | 140±5 |
| Exhaust Back Pressure, in. Hg. | — | 0.7±0.1 | |
| Man. Vac., in. Hg. | — | 15.8 | 14.2 |
| Fuel flow, pounds per hour | 0.7 | 7.5 | 12.0 |
| Test duration, 120 hours. | | | |

The quaternary ammonium salt of the polymer was evaluated against the same polymer which had not been formed into a quaternary ammonium salt form. The results are set forth in Table II below

TABLE II

| Fuel | Dosage | Rating |
|---|---|---|
| (A) Basic Fuel | — | 3.0 |
| (B) Quaternary Ammonium Salt of Polymer of 9% 4-Vinyl Pyridine | 100 PTB* | 7.8 |
| | 50 PTB | 7.8 |
| Polymer of Example B in a non-quaternary ammonium salt form | 100 PTB | 3.4 |

*PTB - pounds per thousand barrels

It is evident from the data above that the quaternary ammonium salt of the polymer is far more effective in preventing deposit build-up on the components of an automotive carburetor. In fact, the quaternary ammonium salt is at least twice effective as the non-quaternary ammonium salt of the same polymer.

In order to evaluate the ability of the quaternary ammonium salt to remove deposits on a carburetor, a Chevrolet Carburetor Detergency Test, Phase III, was performed. According to this test, a running Chevrolet V8 engine mounted on a test stand and fitted with a modified 4-barrel carburetor is employed. The two secondary barrels of the carburetor are sealed and the feed to each of the primary barrels is arranged so that detergent additive fuel can run in one barrel and reference fuel can run in the other. Th primary carburetor barrels are also modified to contain removable aluminum inserts in the throttle plate area so that deposits adhering to the inserts can be conveniently weighed.

The engine is run for a period of time, usually 24 or 48 hours, using a base fuel as the feed to both carburetor barrels with engine blowby circulated to the carburetor air inlet. The weight of the deposits thus formed is measured and recorded. Upon completion of a test cycle, the inserts are removed from the carburetor and weighed to determine the difference between the performances of the test additive vis-a-vis the base fuel. After the aluminum inserts have been cleaned and replaced in the carburetor, the process is repeated with the fuel feeds to the carburetor in the test cycle reversed to minimize any differences in fuel distribution or carburetor construction. The results obtained in two runs are averaged and the effectiveness of the additive fuel in removing deposites is expressed in percent. Set forth below are the values obtained for using, according to the invention, a quaternary ammonium salt of a copolymer containing a basic amino nitrogen vis-a-vis non-quaternary ammonium salts of the same polymer.

TABLE III

| Additive | Deposit Build-up | mg. Removed | Effectiveness % |
|---|---|---|---|
| (A) Base fuel | 16.8 | −1.7 | −10 |
| (B) Quaternary Ammonium Salt of Polymer of 9% 4-Vinylpyridine (Component B) | 17.3 | 12.1 | 71 |
| (C) Non-quaternary ammonium salt of polymer of Example B | 18.8 | 13.4 | 71 |
| (D) Quaternary ammonium salt of polymer of 9% Dimethylaminoethyl methacrylate | 18.6 | 13.1 | 70 |
| (E) Non-quaternary ammonium salt of polymer of Example D | 19.0 | 12.5 | 66 |

While perhaps less dramatic than the data in Table II supra, it is evident that the quaternary ammonium salts of the present invention are generally more effective in removing deposits on a Chevrolet carburetor than the basic polymers themselves. In the test, the base fuel was a commercially available premium base fuel. The additives were supplied to the fuel in an amount of 100 PTB (pounds per thousand barrels) of fuel. The base polymers comprise 20 percent by weight butylmethacrylate, 54 percent by weight Neodol 25 L methacrylate, 16.5 percent Alfol 1620 methacrylate and 9 percent of the indicated nitrogen compound.

What we claim is:

1. A motor fuel composition comprising a gasoline base fuel and from 0.005 to 1 weight percent of a detergent reaction product where said detergent reaction product is obtained by preparing an initial reaction mixture consisting of from 5 to 30 weight percent of butyl methacrylate, 50 to 81 weight percent of a higher ester of methacrylic acid consisting of between 10 and 25% by weight of $C_{16}$-$C_{20}$ esters of methacrylic acid and 40 to 60 weight percent of a $C_{12}$-$C_{15}$ aliphatic ester of methacrylic acid, from 4 to 20 weight percent of a nitrogen containing compound selected from the group consisting of 4-vinylpyridine and dimethylaminoethyl methacrylate and reacting said initial mixture in the presence of a polymerization catalyst and polymerization initiator to produce a first reaction product, admixing said first reaction product with an alkyl halide represented by the formula RX wherein R is an alkyl radical having from 1 to 8 carbon atoms to form a second reaction mixture and reacting said second reaction mixture at a temperature ranging from 40° to 150° C. to form said detergent reaction product.

2. A motor fuel composition according to claim 1 in which said initial reaction mixture consists of 10 to 30 percent butyl methacrylate, 60 to 75 percent said higher ester of methacrylic acid and from 7 to 20 percent of said nitrogen-containing compound.

3. A motor fuel composition according to claim 1 containing from about 0.05 to 0.75 weight percent of said reaction product.

4. A motor fuel composition according to claim 1 in which said polymerization is conducted in the presence of n-dodecylmercaptan.

5. A motor fuel composition according to claim 1 in which said alkyl halide is methyl iodide.

* * * * *